Figure 1:
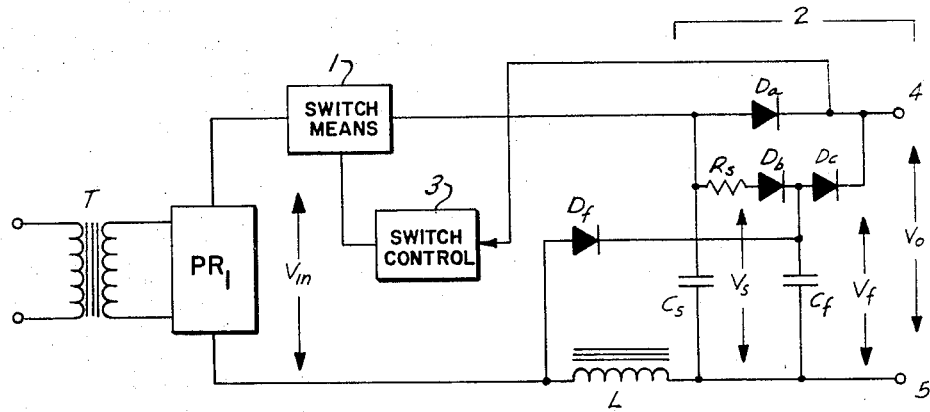

INVENTORS
LESTER DUBIN
SOL GREENBERG
GEORGE GAUTHERIN

BY Morgan, Finnegan, Durham & Pine
ATTORNEYS

INVENTORS
LESTER DUBIN
SOL GREENBERG
GEORGE GAUTHERIN

BY Morgan, Finnegan, Durham & Pine

ATTORNEYS

United States Patent Office  3,293,532
Patented Dec. 20, 1966

3,293,532
SWITCHING AND FLYBACK TECHNIQUES IN REGULATED D.C. POWER SUPPLIES
Lester Dubin, Pelham Manor, Sol Greenberg, Port Washington, and George Gautherin, Woodside, N.Y., assignors to Lambda Electronics Corporation, Huntington, N.Y., a body corporate of New York
Filed June 5, 1963, Ser. No. 285,830
19 Claims. (Cl. 321—18)

This invention relates to regulated D.C. power supplies and more particularly to switching techniques and inductive flyback techniques for improving the capacity and performance of regulated D.C. supplies.

Certain regulated supplies employ switching elements as control devices, these switches being generally solid state devices such as transistors or controlled rectifiers which are connected between the power source and the load, either as part of the rectifier circuit or separate therefrom.

In such power switching circuits chokes are frequently employed to limit current surges. These chokes may sometimes be combined with a diode and it has been proposed to connect this diode to the output filter. When the switching means are cut off, the inductive energy stored in the choke is then discharged as a current through the diode to the output filter, adding an additional charge thereto. Under certain conditions, however, (e.g. low output voltage) and particularly where a switching cycle occurs once during each half wave power cycle, the additional output voltage supplied by the flyback action of the choke is of a sufficient value, that during the occurrence of the next input half wave, the output voltage has not dropped sufficiently to initiate a new switching cycle. Thus switching occurs on every other half cycle. This alternate cycle operation impairs control creates instability problems, and has the effect of causing a unidirectional or unbalanced current to flow in the power transformer secondary whereby serious overheating can occur which limits performance or requires larger, more expensive components. The most serious problem is the periodic loss of control which results. The problem is particularly disturbing when the supply is operated at the lower power frequencies such as 45–70 c.p.s. One solution is to shunt the choke with a diode but this is wasteful of power, the stored inductive energy being dissipated instead of being converted into useful output power.

It is accordingly an object of the invention to provide improved, stabilized inductive flyback techniques in regulated power supplies.

Further objects of the invention are to provide improved switching, inductive flyback and switch control techniques in regulated power supplies for improving the performance and particularly, the range of operation thereof.

The foregoing and other objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

Figure 3:
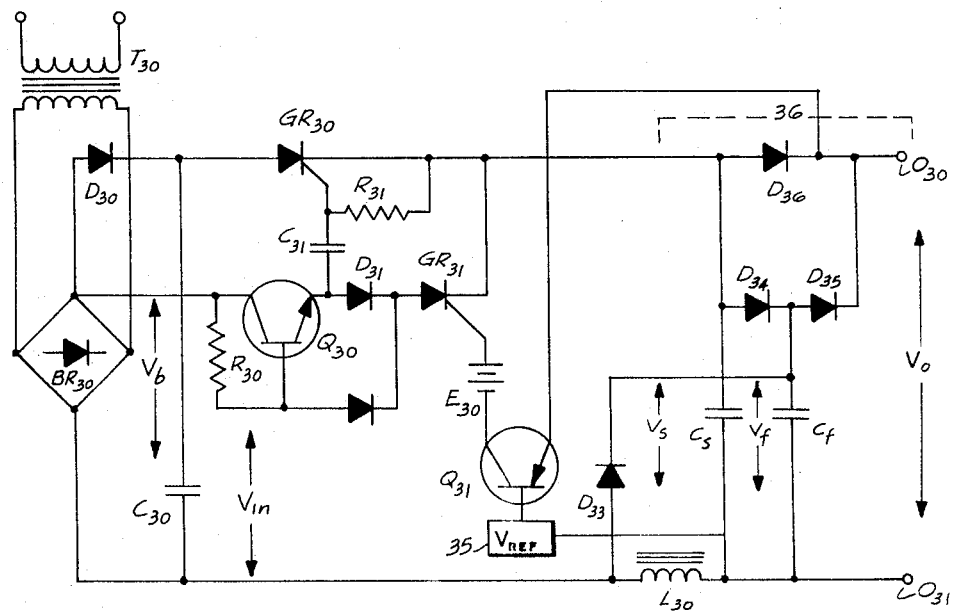
Figure 2:
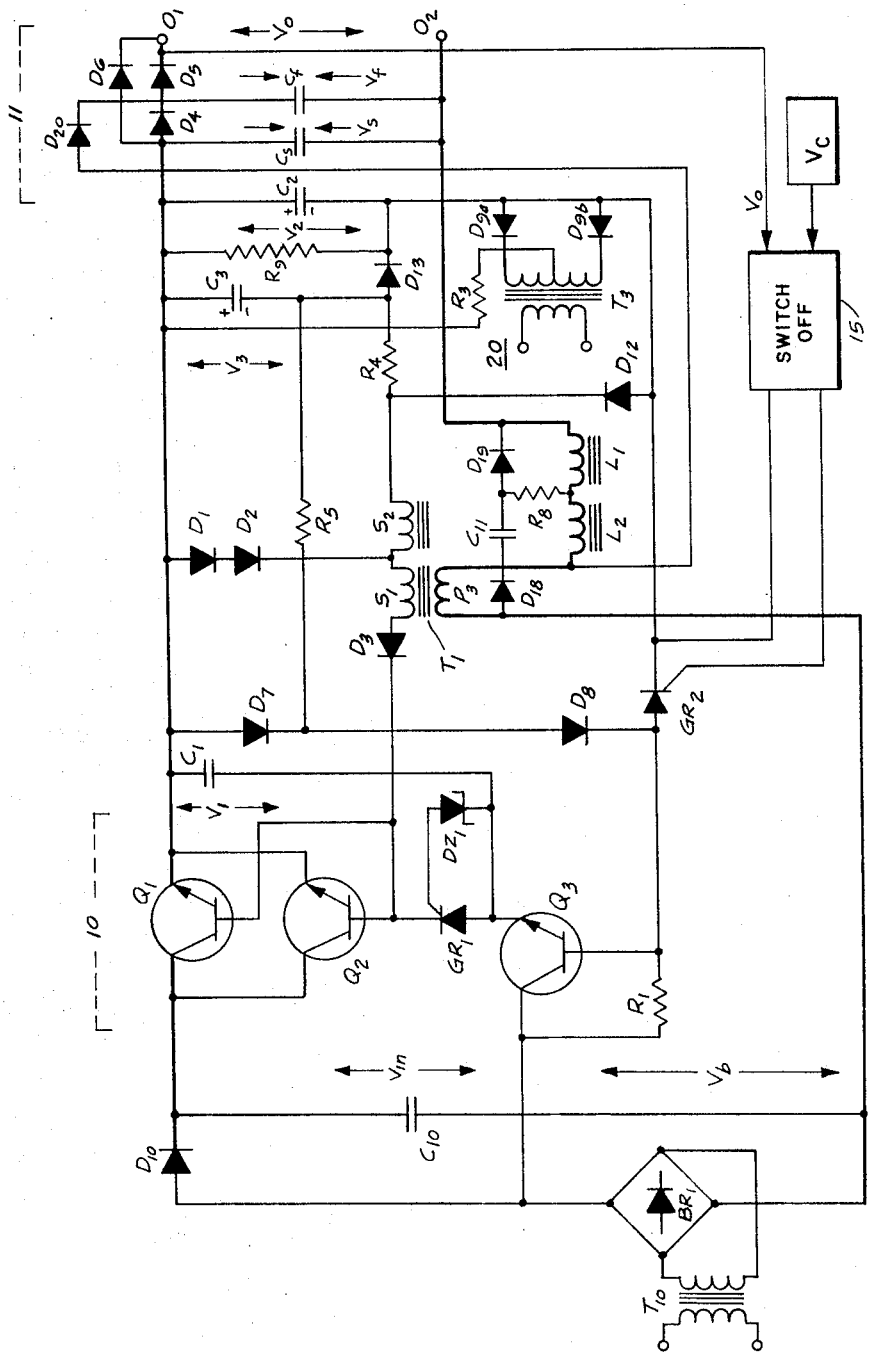

Serving to illustrate exemplary embodiments of the invention together with explanatory data are the drawings of which FIGURE 1 is a simplified schematic diagram of a regulating system according to the invention; and FIGURES 2 and 3 are schematic diagrams illustrating further wide band power supply embodiments of the invention.

In the embodiment of FIGURE 1, alternating current power is applied to the primary winding of a power transformer T, while the secondary is connected to a rectifier $PR_1$. One output terminal of $PR_1$ is connected via switching means 1 to an output circuit 2, the return circuit including inductor L. The switching means 1 may comprise a transistor or controlled rectifier arrangement which is switched on and off under the control of a switch control circuit 3 which is operated in accordance with or as a function of the output voltage $V_o$ appearing across the output terminals 4 and 5 of output circuit 2.

Output circuit 2 includes a filter capacitance $C_s$ connected in serial relation with the rectifier $PR_1$, with the switch means 1 and with the choke L. The common terminal of $C_s$ is connected to output terminal 5 while the other terminal is connected via diode $D_a$ to output terminal 4. The capacitance $C_s$ is charged by the switching means to develop a voltage $V_s$ constituting a component of the output voltage $V_o$. A second filter capacitance $C_f$ has its common terminal connected to $C_s$ and to output terminal 5. Its other terminal is connected to output terminal 4 via a diode $D_c$ and to the other side of $C_s$ via a diode $D_b$ and small resistance $R_s$. The capacitance $C_f$ is operatively allocated to choke L being connected thereto via a diode $D_f$.

The capacitors $C_f$ and $C_s$ may be regarded as components of the total required output filter capacitance. For example, if specifications dictate a 100 mfd. output filter, then $C_s$ and $C_f$ may be assigned values representing fractions thereof such that their sum is the required value. For purposes of explanation it will be assumed that $C_s$ and $C_f$ are equal in value to provide a net capacity of twice the value of each.

During an interval when switch means 1 is conductive, charging current is delivered to $C_s$, increasing $V_s$. (When $V_s$ exceeds $V_f$ by the threshold potential of $D_b$, then part of this current may charge $C_f$ as well; however, this current may be regarded as negligible). Voltage $V_s$ causes current to be delivered through the output terminals 4, 5 to the load via diode $D_a$, and the output voltage $V_o$ follows $V_s$, being offset by the drop across $D_a$. Diode $D_c$ is cut off due to the conduction of $D_a$ and thus $C_f$ does not deliver output current during this switch *on* interval.

When $V_o$, in following $V_s$, reaches a certain value, the switch control circuit 3 is activated. The circuit may include a reference potential source, an error detector or comparator, and suitable amplifiers and drivers for operating switch means 1. When activated, the control circuit disables switch means 1 to open the same. Current through the switching means now reduces to zero, whereby flyback action commences. The energy stored in choke L now causes a reverse polarity voltage to appear across L, and the inductive energy is transferred via current flow through $D_f$ to filter $C_f$ in output circuit 2. Hence $V_f$ increases, $D_b$ is cut off, and, when $V_f$ equals $V_s$, $C_f$ delivers output current via diode $D_c$ to the load along with that supplied by $C_s$ through $D_a$.

The effect of the foregoing arrangement in eliminating the problem of instability associated with a choke such as L may be seen by observing that for stabilized operation, the charge received by the filter during each cycle should equal the charge delivered from the filter to the output each cycle.

The charge received by the filter includes the component received from the choke during flyback, which charge follows the cut off period, is not directly controlled, and would normally tend to produce a transient over-voltage condition. However, by applying the flyback charge to a separate filter capacitor which also supplies the load, the flyback energy is usefully employed without producing overcharge and resultant instability.

For effective operation, a desired relation between the switch-delivered charge, $q_s$, and the charge, $q_f$, due to flyback is established. The relative values of the switch filter $C_s$, and the flyback filter $C_f$ are adjusted accordingly. In the preferred arrangement $q_s$ is assumed equal to $q_v$ (thus the switch condition and flyback intervals are assumed equal); accordingly, the values of $C_s$ and $C_f$ are set equal.

With $C_f$ having half of the total filter capacity and receiving half the total charge, then the voltage increment across $C_f$ is the same as the increment across $C_s$. Departures in operating conditions from these relations do not adversely effect stability.

The circuit of FIGURE 2 illustrates the foregoing arrangement and additional features.

In the circuit of FIGURE 2 a bridge rectifier $BR_1$ is provided which is adapted to be supplied from a source of alternating current. The bridge output, $V_b$, is supplied to the series combination of isolating diode $D_{10}$ and a leakage inductance neutralizing capacitor $C_{10}$, across which the voltage $V_{in}$ is developed.

Energized by $V_{in}$ is the series combination of switching means 10 and an output circuit generally indicated at 11 and having output terminals $O_1$ and $O_2$. Switching means 10 comprise a pair of parallel switching transistors $Q_1$ and $Q_2$ having emitter-collector circuits which controllably deliver current to filters in the output circuit 11 as more fully described hereinafter. The return leg of the supply includes output terminal $O_2$, the choke $L_1$, $L_2$ and the primary winding $P_3$ of a current drive transformer $T_1$ which is connected to the negative terminal of $BR_1$.

The output circuit arrangement is similar to that of FIGURE 1 and includes capacitors $C_s$ and $C_f$ having a common terminal connected to $Q_2$ and each having its other terminal connected to output terminal $O_1$, via respective diodes $D_6$ and $D_5$. Diode $D_4$ interconnects these latter capacitor terminals while flyback diode $D_{20}$ connects filter $C_f$ to chokes $L_1$, $L_2$.

Connected to the positive terminal of $BR_1$ is the combination comprising the emitter-collector circuit of a transistor $Q_3$ and a capacitance $C_1$, the other end of which is connected to the positive leg of the supply at the emitters of $Q_1$ and $Q_2$. A resistor $R_1$ interconnects the collector and base of $Q_3$ while the emitter thereof is connected through a controlled rectifier $GR_1$ to the bases of the switching transistors. The gate of $GR_1$ is connected via a zener diode $DZ_1$ back to the emitter of $Q_3$.

As input voltage $V_b$ rises above a certain value which will be described more fully hereinafter, stage $Q_3$ becomes forward biased; current flows from $BR_1$ through $R_1$ and the base-emitter of $Q_3$, as well as through a collector-emitter of $Q_3$ to capacitor $C_1$, charging the same. As the voltage $V_1$ across $C_1$ increases, a value is reached where zener diode $DZ_1$ is energized. When this occurs the emitter current of $Q_3$ flows through the zener diode $DZ_1$, through the gate-cathode of controlled rectifier $GR_1$ and through $R_5$. $GR_1$ is thereby turned on. $C_1$ now discharges through $GR_1$ and through the base-emitter circuits of transistors $Q_1$ and $Q_2$. Stages $Q_1$ and $Q_2$ are therefore rapidly switched *on* and deliver current, initially from $C_{10}$, and then from $BR_1$, to the output circuit 11. Controlled rectifier $GR_1$ is particularly instrumental in effecting rapid switching of $Q_1$ and $Q_2$.

The current flow resulting from conduction of $Q_1$ and $Q_2$ flows through first filter capacitance $C_s$, through the chokes $L_1$ and $L_2$ and through $P_3$ of current transformer $T_1$.

The current flow thus described charges $C_s$, causing the voltage $V_s$ to rise, and also induces a voltage into the secondary windings $S_1$ and $S_2$ of $T_1$. One side of winding $S_1$ is connected to the positive leg of the supply via serial diodes $D_1$ and $D_2$; the other side of $S_1$ is connected to the bases of $Q_1$ and $Q_2$ via diode $D_3$. The voltage induced in $S_1$ accordingly provides a sustaining current which flows from $S_1$ into the bases of $Q_1$ and $Q_2$ via $D_3$ and the return circuit including diodes $D_1$ and $D_2$. Thus, the output current switched *on* by transistors $Q_1$ and $Q_2$ effects a regenerative action through transformer $T_1$ which increases the drive to the switching transistors. This drive is a function of load current and depends on the turns ratio of the current transformer; the latter is selected to meet the needs of the switching elements 10 to provide the proper self-drive action.

The foregoing conduction of switch transistors 10 causes a rise in voltage $V_s$ and a related rise in the output voltage $V_o$, developed across output terminals $O_1$, $O_2$. The voltage $V_f$ across flyback filter $C_f$ is also increased.

When the voltage $V_s$ achieves the required value a switch-off circuit 15 which may be a comparator or error detector, is activated. The input of this circuit includes a reference voltage $V_c$ and the output voltage $V_o$. The output of circuit 15 is applied to the gate-cathode circuit of a controlled rectifier $GR_2$. The anode of $GR_2$ is connected to the base of $Q_3$ and is also connected via diodes $D_7$ and $D_8$ to the emitters of $Q_1$ and $Q_2$. The junction of $D_7$ and $D_8$ is connected to the bases of $Q_1$ and $Q_2$. Diode $D_7$ is thus connected in parallel with the emitter-base circuits of $Q_1$ and $Q_2$.

The cathode of $GR_2$ is connected to a capacitance $C_2$, the other side of which is connected to the positive leg of the supply. The cathode of $GR_2$ is also connected to a full wave rectifier 20 comprising the center-tapped secondary of a transformer $T_3$ and a pair of diodes $D_{9a}$ and $D_{9b}$, the anodes of which are connected together and to the cathode of $GR_2$. The center tap of $T_3$ is connected to the positive leg of the main supply via resistor $R_3$ while the primary winding of $T_3$ is preferably energized from the same source of alternating current as energizes bridge $BR_1$.

The rectifier 20 charges the capacitance $C_2$ to the indicated polarity and the resultant voltage $V_2$ produces a reverse current flow through the switching transistors when the cut-off rectifier GR is switched on as described above. This cut off current also cuts off stage $Q_3$ and rectifier $GR_1$. Hence, when the output voltage component $V_s$ raises the output voltage $V_o$ to the specified value, the switch transistors 10, the conduction-period rectifier $GR_1$, and the control transistor $Q_3$, are each cut off.

The cut off current derived from $C_2$ initially flows through the emitter-base circuits of $Q_1$ and $Q_2$, through the branch including $GR_1$ and the emitter-base of $Q_3$, through the parallel branch $D_8$ and through $GR_2$. After $Q_1$ and $Q_2$ are cut off, voltage $V_2$ across $C_2$ supplies current through diodes $D_7$ and $D_8$. This transient current is supplemented by sustained current from source 20 to maintain $Q_1$ $Q_2$, $Q_3$ and $GR_1$ cut off.

Although $Q_1$, $Q_2$, $Q_3$ and $GR_1$ are cut off, the voltage induced in $S_1$ has not at this instant reversed polarity. Current from this source thus flows at this time in the alternate path comprising $D_3$, $D_8$, the anode-cathode circuit of $GR_2$, thence through $C_2$ (later through source 20) and diodes $D_1$ and $D_2$ back to $S_1$.

Although $Q_1$ and $Q_2$ are cut off, chokes $L_1$ and $L_2$ continue to supply load energy. Thus, no instantaneous decrease in filter current can occur when the switching transistors 10 are opened. The inductance of $L_1$ and $L_2$ produces the flyback action wherein, after transistors 10 are switched off, a gradually decaying current is fed from the junction of $L_2$ and $P_3$ through diode $D_{20}$ to capacitance $C_f$, causing a rise in voltage $V_f$ which is effectively combined with the voltage $V_s$ to produce load current at the output terminals $O_1$, $O_2$.

The voltage $V_2$ across $C_2$, which provided the initial source of cut off current to switch off transistors 10 and related elements, decays fairly rapidly to zero during the switch-off period. The value of $C_2$ is selected to insure this action at the highest operating frequency of the supply since rectifier $GR_2$ must be cut-off during each operating cycle to provide circuit reset. As $V_b$ drops below $V_o$, and provided $V_2$ is less than the drop across diodes $D_7$ and $D_8$, then controlled rectifier $GR_2$ is reverse-biased, and this circuit reset action occurs. Before this cut off of $GR_2$, and while it is conducting, the control circuit is latched to maintain the switch transistors 10 in their non-conducting state.

For maintaining cut off of switch transistors 10, a circuit including capacitor $C_3$ is provided. Capacitor $C_3$ is charged from source 20 with a voltage $V_3$ of the indicated polarity; this voltage serves to insure continued cut off of $Q_1$ and $Q_2$ after $GR_2$ is extinguished; $V_3$ and source 20 supply a current through the combination of diode $D_7$ and a resistance $R_5$, this combination being connected across $C_3$.

The description supplied thus far may be summarized as follows:

(1) During the rise of input voltage $V_b$, a point is reached where $Q_3$ becomes forward biased. At this time $C_1$ commences to charge; when $V_1$ reaches the breakdown voltage of $DZ_1$ the latter conducts causing conduction rectifier $GR_1$ to fire. Switch transistors $Q_1$ and $Q_2$ are thus switched on. The time at which $Q_1$ and $Q_2$ conduct is seen to be referenced to the leading or rising edge of input voltage $V_b$. Furthermore, the specific time of conduction is a function of the time when $Q_3$ is forward biased and is thus a function of the relation between input voltage $V_b$ and the output voltage component $V_s$.

(2) The return current flow from the output circuit passes through the chokes $L_1$, $L_2$, and through $P_3$ of drive transformer $T_1$; current rise is accordingly gradual rather than abrupt. A responsive voltage is induced in secondary windings $S_1$ and $S_2$. The voltage induced in $S_1$ provides sustaining self drive to the switch transistors $Q_1$, $Q_2$ via $D_3$, and $D_1$, $D_2$. The voltage induced in $S_2$ also contributes drive via $D_3$, $C_3$ and $R_4$. Due to the presence of the auxiliary source 20, the capacitors $C_2$ and $C_3$ are charged during the leading period of input voltage $V_b$.

(3) When the output voltage $V_o$ reaches a predetermined relation with respect to control voltage $V_c$, switch-off action commences, cut-off rectifier $GR_2$ is energized, discharging previously charged capacitor $C_2$ in the reverse direction through the emitter-base circuits of $Q_1$, $Q_2$ and $Q_3$, through the cathode-anode circuit of conduction rectifier $GR_1$ and thence through $GR_2$. Following cut-off of the elements, $Q_1$, $Q_2$, $Q_3$ and $GR_1$, the discharge current of $C_2$ flows through $D_7$ and $D_8$. The drop across $D_7$ keeps $Q_1$ and $Q_2$ reverse-biased and this drop is maintained after $C_2$ discharges due to $C_3$ and source 20. $GR_2$ ultimately cuts off to provide circuit reset.

The flyback action resulting from the inductance of $L_1$ and $L_2$ contributes to the net output voltage $V_o$ by way of the charging of $C_f$ through $D_{20}$. The diode combination including the latter and $D_4$, $D_5$, $D_6$ provides a combining of the switch-derived voltage $V_s$ and the flyback voltage $V_f$. The latter is related to the energy stored in $L_1$, $L_2$ during the switch conduction period and this energy is transferred to useful output energy after the switching means 10 are opened.

The operation of the flyback system depends on the duration of the flyback interval. This interval depends in turn on several factors including choke current and the voltage, $V_f$, across $C_f$. For low values of $V_f$, the flyback interval lengthens. In general, switching will occur twice each power cycle or once for each half wave interval.

To illustrate the flyback action, it is assumed that just prior to a particular switching period, both $C_s$ and $C_f$ have discharged to the value 18 volts. Assuming $D_6$ and $D_5$ each have a potential of 1 volt across them, then the output voltage, $V_o$ at this time is 17 volts. $D_4$ is not conducting and has a substantially zero voltage across it.

When the switch transistors 10 conduct, $C_s$ is charged and $V_s$ commences to increase. Output voltage $V_o$ follows this increase by way of conduction through $D_6$. When $V_s$ reaches reaches 21 volts, $V_o$ is at 20 volts. $D_6$ is conducting and $D_5$ is deenergized. Illustratively, with $V_o$ at 20 volts, the switch-off circuit 15 is activated whereby $GR_2$ fires.

At this time flyback commences and choke current is fed into $C_f$ via $D_{20}$. In the example, the flyback action is of a duration to charge $C_f$ from its original 18 volts to approximately 21 volts. $D_4$ cuts off, and $D_5$ conducts along with $D_6$. Hence, both $C_s$ and $C_f$ deliver current to the load following the flyback period. $V_s$ and $V_f$ therefore decrease until the next switching period arrives.

It may be seen that sensing is effected during the switching period prior to the flyback period and that the flyback charge is applied to a separate capacitance whose output is periodically combined with the output of the switch-associated capacitance for the delivering of current to the load.

The flyback action is manifested by a rapid reversal in the voltage across $L_1$, $L_2$ and $P_3$ and the initiation of conduction of flyback diode $D_{20}$. When $D_{20}$ conducts, a voltage approximating $V_{in}$ is applied across the emitter-collector electrodes of $Q_1$ and $Q_2$. If this voltage is sufficiently high and is applied before collector current has substantially vanished, then excessive dissipation in the switching transistors 10 may result. Thus, for relatively high voltage supplies a flyback delay circuit may be employed to delay conduction of $D_{20}$.

In the illustrated embodiment this takes the form of a circuit including $C_{11}$ and $D_{19}$ which is connected across $L_1$ and $L_2$. At the beginning of the flyback interval, delay is effected due to the charging of $C_{11}$ through $D_{19}$. Prior to this time $D_{19}$ is reverse biased and the effect of $C_{11}$ minimized. Following flyback, $C_{11}$ discharges through $L_2$ and $R_8$. In order to avoid impairment of the choke limiting function by the presence of $C_{11}$, the inductor $L_2$ is preferably disposed on a separate core from $L_1$.

The embodiment of FIGURE 3 employs as the switching means between input voltage $V_{in}$ and output voltage $V_o$, a semi-conductive switching device $GR_{30}$ (sometimes referred to as a gate turn off device) which is illustratively a three terminal device but may be a four terminal type. Switch $GR_{30}$ has a gate for controlling the conduction and cut-off of the anode-cathode circuit and is thus unlike conventional controlled rectifiers where once conduction has been established, the gate-cathode circuit loses control over conduction.

The switching means $GR_{30}$ thus comprises a bilaterally controlled latching rectifier of the semiconductor type wherein the gate-cathode circuit retains control over anode-cathode conduction and can terminate the latter upon receipt of a control or switching current which flows in the reverse direction from the cathode to the gate. Such a rectifier is illustratively of the type described in the Motorola Company specification sheet for the type MGCS 821 solid state switch.

Switch $GR_{30}$ has its anode-cathode circuit connected between an input circuit, $BR_{30}$, $D_{30}$ and $C_{30}$, and an output circuit 36. The input and output circuits are similar to the corresponding circuits in the embodiment of FIGURE 2. $GR_{30}$ is switched on and off as hereinafter described whereby controlled pulses of current are fed to the filters $C_s$ and $C_f$ in the output circuit. Following cut off of $GR_{30}$, the flyback action of choke $L_{30}$ in the negative leg of the supply, supplies additional charge to filter $C_f$ as hereinbefore described.

The control circuit of $GR_{30}$ includes a resistance $R_{31}$ connected between its gate and cathode, and an npn transistor stage $Q_{30}$; the latter has an emitter which is connected to the gate of $GR_{30}$ via capacitance $C_{31}$, and a collector which is connected to the positive terminal of $BR_{30}$. Collector and base of $Q_{30}$ are interconnected via $R_{30}$.

The emitter of $Q_{30}$ is also connected to the positive leg of the supply via a diode $D_{31}$ and the anode-cathode circuit of a conventional controlled rectifier $GR_{31}$. The base of $Q_{30}$ is connected to this circuit at the junction of $D_{31}$ and $GR_{31}$, via $D_{32}$.

The cathode of $GR_{31}$ is connected to the cathode of $GR_{30}$ while the gate is connected to output terminal $O_{30}$ through the series combination of a voltage source $E_{30}$ and the collector-emitter circuit of a pnp transistor $Q_{31}$. The base of $Q_{31}$ is returned to the negative terminal $O_{31}$ through a source 35 of reference potential, $V_{ref}$.

In a typical operating sequence, transistor stage $Q_{30}$ becomes forward-biased and conducts during the leading or rising interval of bridge voltage $V_b$ when this voltage exceeds $V_s$. Current then flows in the forward direction through $Q_{30}$, $C_{31}$ and the gate-cathode of $GR_{30}$. When this current reaches the threshold value of $GR_{30}$ the latter is transferred to the conductive state and current is delivered to the output circuit, increasing $V_s$ and $V_o$. At this time $Q_{30}$ becomes reversed biased and $C_{31}$ has received an appropriate charge, which as noted below, is used in the turn-off operation.

When $V_o$ reaches the required value relative to $V_{ref}$, the emitter-base of $Q_{31}$ becomes forward biased and the emitter-collector circuit thereof becomes conductive. At this time $E_{30}$ supplies current from its positive terminal through the gate-cathode of $GR_{31}$, through $D_{36}$, and through the emitter-collector of $Q_{31}$ to its negative terminal. $GR_{31}$ is thus transferred to the conductive state.

With $GR_{31}$ on, the capacitance $C_{31}$, which was charged during the transient period preceding the firing of $GR_{30}$, discharges through $D_{31}$, through the anode-cathode of $GR_{31}$, and through the cathode-gate of $GR_{30}$ whence the latter is cut-off. The resultant drop across $D_{31}$ serves to maintain $Q_{30}$ cut-off. Conduction of a small current through $GR_{31}$ continues via $R_{30}$ and $D_{32}$ until $V_b$ falls below $V_s$.

Following cut-off of $GR_{30}$ and during flyback period, the inductance $L_{30}$ supplies charging current to $C_f$ via $D_{33}$. During the next cycle, the control operation is repeated provided sufficient load current has been drawn from the output circuit.

In analyzing and practising the invention, modifications will undoubtedly occur to those skilled in the art. The invention is thus not limited to the specific circuits shown and described, but departures may be made therefrom within the scope of the accompanying claims without departing from the principles of the invention and without sacrificing its chief advantages.

What is claimed is:

1. A flyback stabilized, wide band, regulated power supply adapted to convert an A.C. input to a regulated D.C. output comprising a power rectifying switching circuit adapted to be energized by said A.C. input in synchronism therewith and including switch means and choke means, an output circuit including having an output terminal and flyback stabilizing and filter means comprising first filter means connected to said power switching circuit and responsive to current flow supplied by said switch means through said choke means and second filter means connected to said power switching circuit and to said choke means for responding to current supplied by said choke means during the flyback period thereof, a first current path independent of said choke connecting said first filter means to said output terminal, a second current path independent of said choke means connecting said second filter means to said output terminal, and regulating feedback means interconnecting said output circuit and said power switching circuit for regulating said output.

2. A supply as defined by claim 1 in which said switch means, choke means and first filter means are serially interconnected for energization by said A.C. input and in which said second filter means is unilaterally connected to said first filter means and to said choke means.

3. A supply as defined in claim 1 in which said regulating feedback means includes means responsive to the output supplied by said first filter means for switching off said switch means when said output reaches a requisite value.

4. A supply as defined in claim 1 in which said first and second filter means having substantially equal capacitance.

5. A supply as claimed including first and second diode means and in claim 1 in which said first and second filter means are interconnected by way of said first diode means, and in which said second filter means interconnects with said choke means by way of said second diode means.

6. A supply as claimed in claim 1 including delay means for retarding the response of said second filter means to said choke means.

7. A supply as claimed in claim 1 including means coupled to said choke means and to said switch means for supplying drive for said switch means.

8. A supply as claimed in claim 1 including switch control means coupled to said input for actuating said switch means in dependence on the amplitude of said input.

9. A regulated power supply adapted to convert an A.C. input to a regulated D.C. output comprising a power rectifying switching circuit adapted to be energized by said A.C. input and including semi-conductor switch means and load current carrying inductive means, an output circuit connected to said power switching circuit, a drive circuit interconnecting said switch means and said inductive means for providing drive to said switch means in response to said inductive means, and a regulating feedback circuit between said power switching circuit and said output circuit for controlling said switch means.

10. A supply as defined in claim 9 in which said inductive means comprise a transformer having one winding in said power switching circuit and another winding in said drive circuit.

11. A supply as defined in claim 10 in which said switch means comprise a transistor having its emitter-collector circuit in series relation with said output circuit and its base connected to said drive circuit.

12. A supply as defined in claim 11 in which said output circuit includes first filter means connected to said switch means, second filter means connected to said inductive means, an output terminal, and a summing circuit interconnecting said first and second filter means with said output terminal for supplying current thereto from said first and second filter means.

13. A power supply filter circuit for use with a rectifier comprising a choke having one terminal for connection to said rectifier, a pair of filter capacitances having a common terminal connected to another terminal of said choke, one of said capacitances having another terminal adapted for connection to said rectifier, first diode means coupling said choke to another terminal of the other of said capacitances, an output terminal, and a diode combining circuit interconnecting said capacitances and said output terminal for combining the outputs of said capacitances at said output terminal.

14. A filter circuit as defined in claim 13 in which said combining circuit comprises coupling diodes connected respectively between said other terminals of said capacitances and said output terminal, and a diode interconnecting said other terminals of said capacitances.

15. A wide band, switching-type regulated D.C. power supply comprising a rectifier circuit adapted to be energized by a source of alternating current, an output load circuit including capacitive filter means, load current carrying switch means interconnecting said rectifier circuit and said output circuit for regulating the output fed to said load circuit, switch control means connected to said switch means and including a first controlled rectifier circuit for energizing said switch means and a second controlled rectifier circuit interconnected with said output circuit and having reference potential means for de-energizing said switch means to effect output regulation.

16. A supply as defined in claim 15 including a current transformer having a primary winding connected to said output circuit and a secondary winding connected to said switch control means for supplying self drive to said switch means.

17. A supply as defined in claim 15 including a choke in said output circuit and wherein said capacitive filter means include capacitance primarily charged by said switch means and additional capacitance primarily charged by said choke.

18. A wide band regulated D.C. power supply comprising a rectifier circuit adapted to be energized by an alternating current source and including a bilaterally controllable rectifier switch, an output circuit connected to said rectifier circuit for supplying a load, switch control means connected between said output circuit and said switch for controlling the conduction period of said switch to regulate said output, choke means connected in said output circuit and capactive filter means in said output circuit including flyback diode means, a first capacitance on the load side of said choke connected to be primarily responsive to said switch and second capacitance connected between said flyback diode means and the load side of said choke to be primarily responsive to said choke means.

19. A supply as defined in claim 18 in which said switch control means include a controlled rectifier responsive to output voltage for deenergizing said switch.

References Cited by the Examiner
UNITED STATES PATENTS

| | | | |
|---|---|---|---|
| 2,836,784 | 5/1958 | Gross | 321—16 |
| 3,105,184 | 9/1965 | Westlocke | 321—18 |
| 3,185,912 | 5/1965 | Smith et al. | 321—18 |
| 3,201,679 | 8/1965 | Buchanan et al. | 323—22 |
| 3,218,542 | 11/1965 | Taylor. | |
| 3,239,748 | 3/1966 | Bergland | 323—22 |

OTHER REFERENCES

Electronics, "Power Supply Uses Switching Pre-regulation," March 9, 1962, McGraw-Hill Pub. Company, New York, pp. 62–64.

JOHN F. COUCH, *Primary Examiner.*

M. L. WACHTELL, *Assistant Examiner.*